(12) United States Patent
Pfau et al.

(10) Patent No.: US 11,003,262 B2
(45) Date of Patent: May 11, 2021

(54) INPUT KNOB FOR A TOUCH-SENSITIVE SURFACE IN A DISPLAY SYSTEM

(71) Applicant: VISTEON GLOBAL TECHNOLOGIES, INC., Van Buren Township, MI (US)

(72) Inventors: Douglas Allen Pfau, Canton, MI (US); Rhodri Elliott, Ann Arbor, MI (US); David Michael Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 16/450,357

(22) Filed: Jun. 24, 2019

(65) Prior Publication Data

US 2019/0391671 A1    Dec. 26, 2019

Related U.S. Application Data

(60) Provisional application No. 62/787,914, filed on Jan. 3, 2019, provisional application No. 62/689,507, filed on Jun. 25, 2018.

(51) Int. Cl.
*G06F 3/0362* (2013.01)
*G06F 3/044* (2006.01)
(Continued)

(52) U.S. Cl.
CPC ............ *G06F 3/0362* (2013.01); *G06F 3/038* (2013.01); *G06F 3/044* (2013.01); *G06F 3/0416* (2013.01);
(Continued)

(58) Field of Classification Search
CPC ...... G06F 3/0362; G06F 3/038; G06F 3/0416; G06F 3/044; G06F 3/04817; G06F 3/04847; G06F 3/0485
(Continued)

(56) References Cited

U.S. PATENT DOCUMENTS 5,936,613 A * 8/1999 Jaeger .................... G06F 3/0238
345/172
7,602,376 B1 * 10/2009 Hetherington ........... G05G 1/04
345/161
(Continued)

*Primary Examiner* — Chanh D Nguyen
*Assistant Examiner* — Ngan T. Pham-Lu
(74) *Attorney, Agent, or Firm* — Quinn IP Law

(57) ABSTRACT

An input knob for use with a touch screen device includes stationary and moveable members. The stationary member adheres to a touch screen of the device. The moveable member moves relative to the stationary member, and is secured to the surface via the stationary member. The moveable member produces touch events on the touch surface as bits of data in response to movement of the moveable member. The moveable member may include a rotary encoder. The stationary member may include conductive pads in contact with the surface and in selective contact with a conductive mass of the moveable member. The moveable member may be ring-shaped, removeable and repositionable with respect to the surface, and/or constructed of or coated by dielectric materials. The knob may lack a direct hardwired electrical connection to or through the surface. A display system includes the touch screen device and knob.

20 Claims, 5 Drawing Sheets

(51) Int. Cl.
  *G06F 3/0485* (2013.01)
  *G06F 3/038* (2013.01)
  *G06F 3/041* (2006.01)
  *G06F 3/0484* (2013.01)
  *G06F 3/0481* (2013.01)

(52) U.S. Cl.
  CPC ........ *G06F 3/0485* (2013.01); *G06F 3/04817* (2013.01); *G06F 3/04847* (2013.01)

(58) Field of Classification Search
  USPC .......................................................... 345/174
  See application file for complete search history.

(56) References Cited

U.S. PATENT DOCUMENTS

| | | | |
|---|---|---|---|
| 10,551,798 B1* | 2/2020 | Bushnell | G04B 3/04 |
| 2015/0169080 A1* | 6/2015 | Choi | G06F 3/0488 |
| | | | 345/174 |
| 2017/0153718 A1* | 6/2017 | Brown | G06F 3/0362 |

* cited by examiner

INPUT KNOB FOR A TOUCH-SENSITIVE SURFACE IN A DISPLAY SYSTEM

CROSS REFERENCE TO RELATED APPLICATIONS

This application claims the benefit of U.S. Provisional Patent Application No. 62/689,507, filed on Jun. 25, 2018, and entitled "ELECTRICALLY DECOUPLED DIGITAL BIT FOR CAPACITIVE TOUCH SENSOR AND COMMUNICATION PROTOCOL FOR IDENTIFICATION, LOCATION, AND INFORMATION TRANSFER OF DIGITAL INFORMATION OF AN ARBITRARILY SHAPED TOUCH SURFACE OF AN ATTACHED MECHANISM", and of U.S. Provisional Patent Application No. 62/787,914, filed on Jan. 3, 2019, and entitled "INPUT KNOB FOR A TOUCH SENSITIVE SURFACE IN A DISPLAY SYSTEM", both of which are incorporated by reference in their entireties.

TECHNICAL FIELD

The present disclosure relates to information display systems having a touch-sensitive surface and mechanical input devices for use with such a surface.

BACKGROUND

Touch screen devices are used to facilitate direct user interaction with a wide variety of systems. For example, "infotainment" systems typically present user-selectable control options and other useful information to a user as image icons and/or text messages via a colorful touch-sensitive display screen ("touch surface"). The user selects desired information or requests execution of a particular system operating mode by touching a designated area on the touch screen. A touch event, i.e., a detected conductive contact with the touch surface, is registered by a microcontroller in communication with the touch screen. Detectable touch events are typically achieved using the user's fingertip or a specially configured input stylus.

A given touch screen device relies on a particular set of underlying touch detection technology to accurately detect the above-noted touch event, and to thereafter translate the detected touch event into a corresponding screen position. For instance, a projective capacitance-based touch screen may use an electrode grid to project an electric field through a substrate. Contact with the touch surface at or more discrete points is detected by the microcontroller by monitoring the electric field effects of the contact. Because a touch event corresponds to a surface location that is associated with particular information, a detected touch point is readily translated by the microprocessor and associated control logic into a desired control response. Other types of touch screen devices rely on different underlying technologies to achieve similar ends, with common examples including surface capacitive, infrared, and resistance sensing.

SUMMARY

An input device is disclosed herein that is configured for use with a touch screen device having a display screen with a touch-sensitive surface ("touch surface"). The input device is referred to herein as an "input knob" for clarity and simplicity, with the term "knob" broadly encompassing any fully or partially flat, concave, and/or convex structure of an application-suitable size and shape, e.g., an annulus or ring-shaped input device as depicted in the various Figures.

The disclosed input knob may "float" with respect to the touch surface in some embodiments in the sense that the input knob is characterized by an absence of conductive wires or other direct/hardwired electrical connections extending between or through the input knob and the touch surface. The disclosed input knob may also be removably connectable to/disconnectable from the touch surface in an optional configuration. The input knob may be attached to the touch screen using a non-conducting adhesive material and/or another suitable attachment material or device that does not interfere with operation of the technology set forth herein.

In order to register a discrete touch event, the input knob may rely on the periodic actuation of internal switches to bring a sufficiently large conductive mass into electrically conductive contact with the touch surface. Such a mass, also referred to as an "anchor member" herein, may be housed within a stationary member of the input knob. Conductive base pads may be positioned at several locations around a circumference of such a stationary member. Other embodiments may be envisioned within the scope of the disclosure, e.g., infrared or other variations of the disclosed example embodiments, and therefore the methodology described herein could be applied to other touch detection technologies outputting similar digital encoder signals but not necessarily relying on such a conductive mass/spring approach. Therefore, the conductive mass variation described herein is intended to be illustrative of the present teachings and non-limiting.

Touch functionality may be enhanced by use of the disclosed input knob. When using the input knob as an external mechanical input device, for example, the input knob's rotary and/or translational movement produces a stream of electrically-decoupled digital bits, i.e., a plurality of digital encoder signals having a binary logical state of 1/high during a positive touch event between at the touch surface and 0/low otherwise, with the non-contact state also referred to as an "open state" or a "negative touch event". The number of digital encoder signals may match the number of conductive base pads of the input knob, with each base pad thus forming fixed reference points on the touch surface, and each base pad ultimately corresponding to the location of at least some of the discrete touch points.

A simplified rotary embodiment of the disclosed input knob may be envisioned as a capacitive touch interface using two digital bits. The two digital bits in such an embodiment may be output by a two-channel rotary encoder to register rotational speed and direction. Additional bits may be added for improved accuracy, functionality, and/or redundancy. Other embodiments unrelated to rotational information transfer are also permitted. As an example, the additional bits could be used for a momentary switch. Electrically-decoupled digital bit interface embodiments are provided as examples herein for the purposes of illustration. In other examples, embodiments may be used in connection with gloves or mittens, e.g., for cold weather interaction with cell phones or other capacitive devices.

The input knob according to an exemplary embodiment includes a stationary member and a moveable member. The stationary member is configured to be adhered to the touch surface. The moveable member is connected to the stationary member and configured to move relative to the stationary member. The moveable member is configured to selectively output two or more bits of data indicative of a discrete touch event in response to a movement of the moveable member, with the two or more bits of data representing at least a speed and a direction of the movement of the moveable member.

The moveable member may rotate with respect to the stationary member as and/or translate with respect to the stationary member as the movement. The moveable member may include a rotary encoder configured to output the two or more bits of data in response to the movement of the moveable member.

Some configurations of the stationary member include two or more conductive pads in direct continuous contact with the touch surface, with the pads in selective contact with a conductive mass of the moveable member via a switch in response to the movement of the moveable member. The conductive mass may be optionally embodied as a solid plate or block of ferromagnetic material or copper.

The moveable member may be shaped as a ring or an annulus.

An embodiment of the stationary member is removably adherable to the touch surface via a non-permanent adhesive material. The moveable member may be optionally constructed of or coated by a dielectric material.

The input knob may be characterized by an absence of a direct hardwired electrical connection to or through the touch surface.

Also disclosed herein is a display system. An exemplary configuration of the display system includes a touch screen device and an input knob, with the touch screen device having a touch surface. The input knob may include a stationary member that is adhered to the touch screen, and a moveable member connected to and configured to move relative to the stationary member. The moveable member is configured to selectively output two or more bits of data indicative of a discrete touch event in response to a movement of the moveable member, with the two or more bits of data representing at least a speed and a direction of the movement of the moveable member.

The display system may include a microcontroller in communication with the touch surface. The microcontroller in this embodiment is configured to receive the two or more data bits and, in response to the two or more bits of data, to control an operating mode of one or more controlled subsystems.

The touch screen device may be configured as an infotainment system, with the operating mode in such an embodiment being a mode setting of the infotainment system.

The moveable member may be rotatable with respect to the stationary member as the movement, and may include a rotary encoder operable for outputting the at least two bits of data responsive to rotation of the moveable member.

Movement of the moveable member may cause the microcontroller to scroll between a plurality of icons displayed on the touch surface.

In another embodiment, the display system includes a touch screen device having a touch surface, an input knob characterized by an absence of a direct hardwired electrical connection to or through the touch surface, and a microcontroller. The input knob includes annular stationary and rotatable members. The stationary member is adhered to the touch screen and includes two or more conductive pads in direct continuous contact with the touch surface, and in selective contact with a conductive mass of the moveable member via respective switches. The rotatable member is connected to and configured to rotate relative to the stationary member to thereby place the two or more conductive pads in contact with the conductive mass. The annular rotatable member selectively outputs two or more bits of data indicative of a discrete touch event in response to a rotation of the moveable member, the two or more bits of data representing at least a speed and a direction of the rotation of the annular rotatable member.

The microcontroller, which is in communication with the touch surface, receives the two or more data bits and, in response to the two or more bits of data, controls an operating mode of one or more controlled subsystems.

The above features and advantages and other features and advantages of the present teachings are readily apparent from the following detailed description of the best modes for carrying out the teachings when taken in connection with the accompanying drawings.

Figure 1:
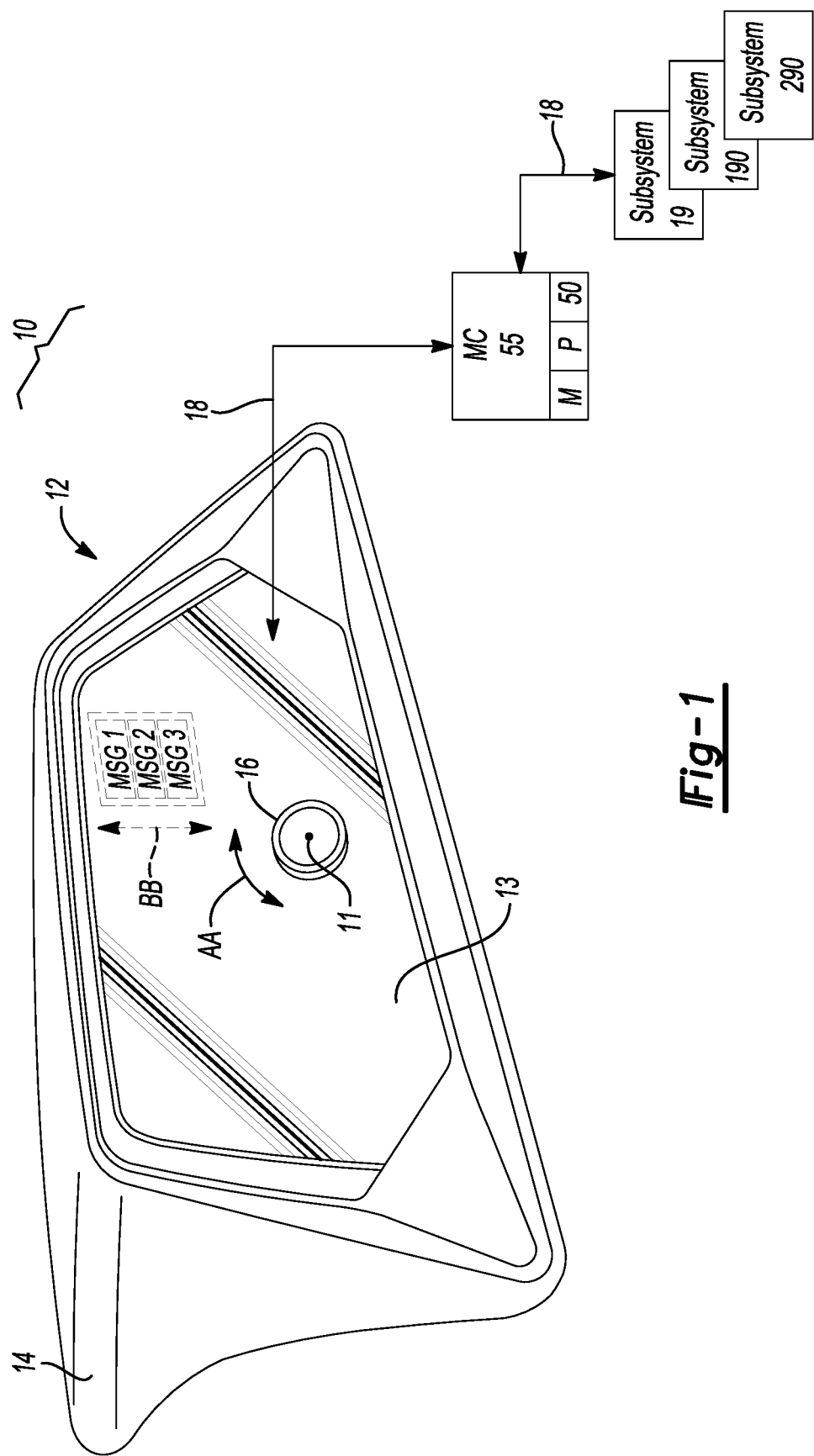
FIG. 1 is a schematic perspective view illustration of an example touch screen device having a display screen with a touch surface and an input knob, with the input knob constructed as described herein.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the appended claims.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the drawings, wherein like numerals indicate like parts throughout the several views, a display system 10 is shown schematically in FIG. 1. The display system 10 includes a touch screen device 12, one or more input knobs 16, and a microcontroller (MC) 55. The touch screen device 12, which in some applications may be in communication with one or more controlled subsystems 19, 190, and/or 290, has a touch-sensitive surface ("touch surface") 13 that may be optionally embodied as a capacitive touch surface. Other underlying technologies suitable for detecting touch events in the manner described herein may be used within the scope of the disclosure as noted above. The present teachings are expected to function equally well on curved surfaces with a matching curved surface on the input knob 16. However, solely for illustrative simplicity the touch surface 13 is depicted as a flat surface in FIG. 1.

Performance of the touch screen device 12 may be enhanced by the input knob 16. The input knob 16 may be permanently or removably attached to the touch surface 13, with a moveable member 22 (see FIG. 3) of the input knob 16 being freely rotatable about its center axis 11 in some embodiments as indicated by double-headed arrow AA. In other embodiments, the moveable member 22 may be translated away from its center axis 11 as the contemplated movement. Therefore, the term "moveable" may encompass rotary and/or linear/translational movement in different embodiments.

As noted above, the input knob 16 shown in FIG. 1 may be characterized by an absence of conductive wires or other direct electrical connections between the structure of the input knob 16 and that of the touch surface 13, with such a characteristic referred to herein as "floating". Instead, the input knob 16 may be permanently or removably attached to the touch surface 13 using a non-conductive adhesive material. If electrically-conductive attachment materials were to be used in a two-bit embodiment, for instance, the two data bits could appear as a single bit, and thus the use of non-conductive materials is intended to minimize data error. Attachment materials should also be selected to avoid signal degradation, with foam core tape being an example material that may degrade signal performance in a capacitive touch sensor.

A user may interact with the input knob 16 in order to register a desired touch event. Interacting with the input knob 16, such as gripping and rotating and/or translating the input knob 16 in a particular direction, is sufficient to input desired touch events relative to freehand operation, for instance when traveling along a bumpy road surface in a vehicle (not shown). The input knob 16 configured as set forth herein may help stabilize the user's hand, which may help lessen the effects of external forces. As such, the input knob 16 may help to improve accuracy of detection of the user's intended touch events.

The input knob 16 of FIG. 1, when positioned with respect to the touch surface 13 as shown, is configured to selectively register touch events on the touch surface 13 at multiple discrete points. The terms "touch event" and "touch point" are used interchangeably herein, with a touch event being a state of direct continuous contact between a conductive mass of the input knob 16 to a conductive base pad 24 of the input knob 16 (see FIG. 6), through intervening switch structure in some embodiments, and with a touch point being the particular point or points on the touch surface 13 corresponding to such an event. Four or more touch events/points may be used in other embodiments for additional performance features. For example, a user may rotate or translate the input knob 16 to a corresponding position on the touch surface 13 in order to select a desired operating mode of a controlled subsystem 19, 190, and/or 290, and/or the user may register a touch input via activation of the input knob 16 itself, with the latter option possibly outputting a corresponding data bit.

The touch screen device 12 of FIG. 1 is in communication with the microcontroller 55 over a suitable low-voltage bus 18, with the term "low-voltage" generally referring to auxiliary voltage levels of 12V or less, e.g., 5V. In a possible embodiment, the low-voltage bus 18 may be a two-wire interface bus, e.g., an Inter Integrated Circuit (I2C) bus. The microcontroller 55 may include one or more processors (P), each of which may be embodied as a separate microprocessor, an application specific integrated circuit (ASIC), or a dedicated electronic control module. The microcontroller 55 also includes sufficient amounts of memory (M), i.e., random access memory, read-only memory, and flash memory or other types of electrically-erasable read-only memory, as well as accompanying hardware in the form of a high-speed clock or timer, input/output circuitry, etc. Computer-readable and executable instructions embodying the present calibration method 50 may be stored in memory (M) and executed as set forth herein to calibrate the touch screen device 12.

The touch screen device 12 may be optionally secured and protected within a housing 14. For instance, when the display system 10 is configured as combined information and entertainment ("infotainment") system or as a navigation system, the housing 14 may be surrounding structure of an instrument panel, dashboard, or center-stack of a vehicle (not shown). Alternatively, the display system 10 may be used as part of a control or monitoring station of a powerplant, or as part of a human-machine interface of an appliance or other display system 10. Solely for illustrative consistency, the touch screen device 12 will be described hereinafter in the context of an onboard infotainment system without limitation.

A user of the touch screen device 12 of FIG. 1 may select information and/or desired operating modes of one or more of the controlled subsystems 19, 190, and/or 290 via touch interaction with the touch surface 13. Such interaction may entail use of the input knob 16 alone or in conjunction with touch interaction with areas of the touch surface 13 lying outside of the input knob 16. That is, operation of the input knob 16 is not affected by touch inputs or swipes occurring in areas of the touch surface 13 lying outside of the input knob 16.

In some embodiments, rotation of the input knob about its center axis 11 (arrow AA) will result in the microcontroller 55 toggling, cycling, or otherwise scrolling (arrow BB) between various displayed icons or messages, with such icons or messages exemplified in FIG. 1 as MSG1, MSG2, and MSG3. Once a given icon or message is selected for display, the user may touch the displayed icon/message directly, or possibly via depression of the input knob 16 when a particular icon/message is selected, to activate a corresponding function and/or submessage. As an illustrative example, a user may select a message "tire pressure" and then touch the displayed message icon to bring up a list of individual tire pressures, or the selection of the message by rotation or other movement of the input knob 16 may itself activate an underlying function.

Figure 2A:
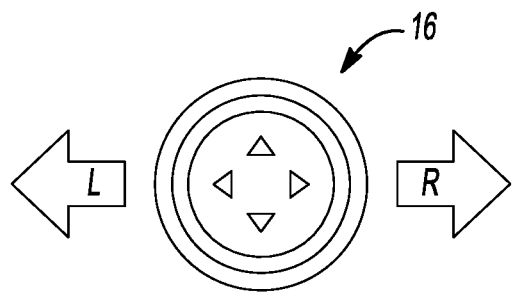
FIGS. 2A-F schematically depict example control functionality enabled by the representative input knob of FIG. 1.
Figure 2B:
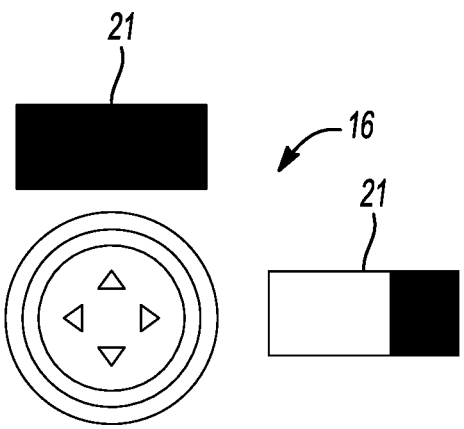

Referring to FIGS. 2A-2F, the input knob 16 depicted in FIG. 1 may be used in a variety of ways depending on the programming of the microcontroller 55 and the configuration of the controlled subsystems 19, 190, and 290. For instance, FIG. 2A depicts an optional configuration of the input knob 16 that is moveable in a lateral direction, i.e., left (L) or right (R) with respect the user's forward-facing frame of reference, in order to select an application or operating mode, and/or to change the displayed information on the touch surface 13 of FIG. 1. FIG. 2B depicts an optional embodiment in which an extended depression of the input knob 16 opens a set of preview icons 21 around the perimeter of the input knob 16 for selection by the user, with alternative icons 211 shown in FIG. 2D.

Figure 2C:
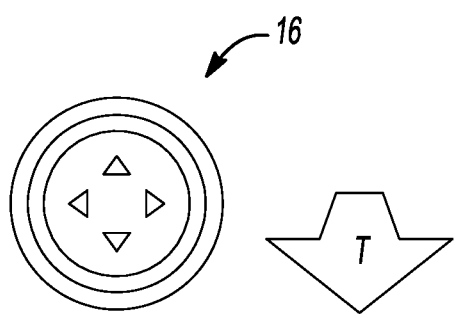
Figure 2D:
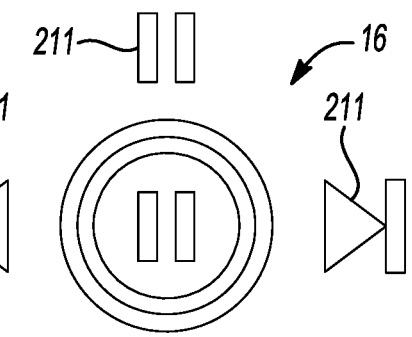
Figure 2E:
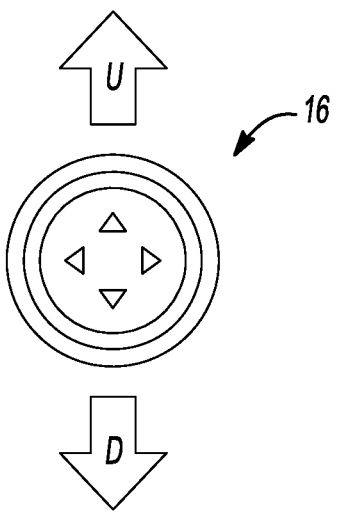
Figure 2F:
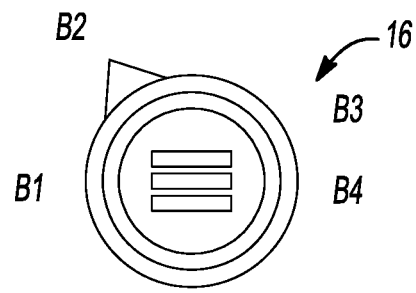

FIGS. 2C and 2E illustrate additional embodiments in which the input knob 16 may be urged in a particular direction around the perimeter of the input knob 16 to thereby open or select corresponding information or operating modes from the touch surface 13, whether by pulling lightly on the input knob 16 as indicated by arrow T of FIG. 2C or urging the input knob 16 up or down as indicated by arrows U and D in FIG. 2E. Similarly, FIG. 2F illustrates a possible embodiment in which icons B1, B2, B3, B4 progressively appear or are continuously displayed as the input knob 16 is rotated. The icons B1, B2, B3, and B4 may surround the input knob 16 as shown, or the icons B1, B2, B3, and B4 may appear as the messages MSG1, MSG2, MSG3, etc. of FIG. 1. Depending on the embodiment and whether the input knob 16 is a 2-bit or a 3-bit device, pressing of the input knob 16 may trigger selection of a given mode or information piece, or rotation of the input knob 16 may accomplish this alone or in conjunction with registering of a separate touch event.

With respect to the controlled subsystems 19, 190, and 290, as will be appreciated by one of ordinary skill in the art the example touch screen device 12 of FIG. 1 may be used to control a wide variety of functions. By way of example, the controlled subsystem 19 may be a heating, ventilation, cooling, and air conditioning (HVAC) system and the controlled subsystem 190 may be a radio, with the controlled subsystem 290 being another device, e.g., a lighting system, a digital video disc or compact disc player, a navigation screen, etc. In certain embodiments, two or more of the controlled subsystem 19, 190, and 290 and the touch screen device 12 may be integrated into a single device, e.g., the above-noted infotainment system, and thus the depiction of separate subsystems 19, 190, and 290 and a separate touch screen device 12 is exemplary and non-limiting.

Figure 3:
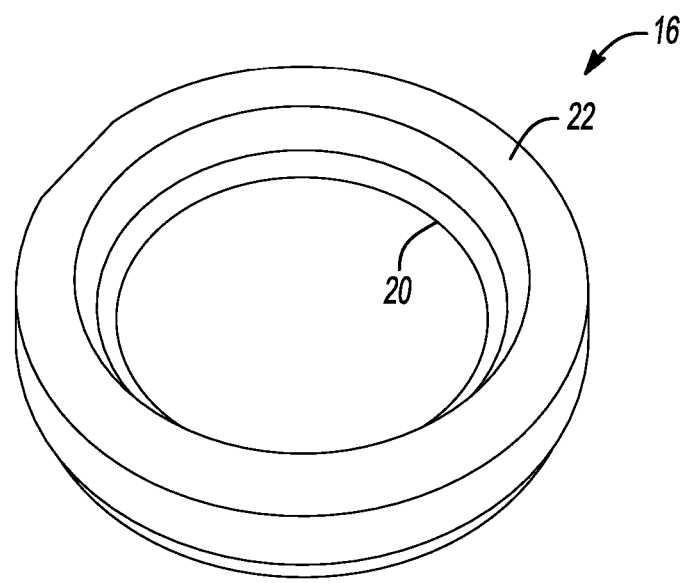
FIG. 3 is a schematic perspective view illustration of an input knob usable as part of the touch screen device shown in FIG. 1.

FIG. 3 schematically illustrates the input knob 16 according to a non-limiting example embodiment in which the input knob 16 is shaped like a ring or annulus. The input knob 16 may include respective stationary and moveable members 20 and 22, with the stationary member 20 forming an anchor member that is permanently or removably attached to the touch surface 13 of FIG. 1, e.g., via an adhesive material, magnetic attraction, or other suitable attachment materials or mechanisms. The moveable member 22 engages the stationary member 20 in this embodiment, and rotates, translates, and/or otherwise moves with respect to the center axis 11, e.g., as a control dial with optional click-based input functions. Thus, the stationary and moveable members 20 and 22 form the input knob 16 and work together as shown in the example of FIG. 4 to register discrete touch points on the touch surface 13 of FIG. 1.

The moveable member 22 may be optionally constructed of or coated by a dielectric material. For instance, the input knob 16 may be optionally coated with an insulating material such as rubber, glass, or plastic, and/or treated with paints or other surface treatments. This particular feature would enable a user to operate the input knob 16 while wearing gloves, as a direct conductive path to the user's bare hand or fingers is not required for registration of touch events. It is therefore not necessary for the input knob 16 to have a specific exterior construction, either conductive or non-conductive, within the scope of the disclosure, unless otherwise specified.

Figure 4:
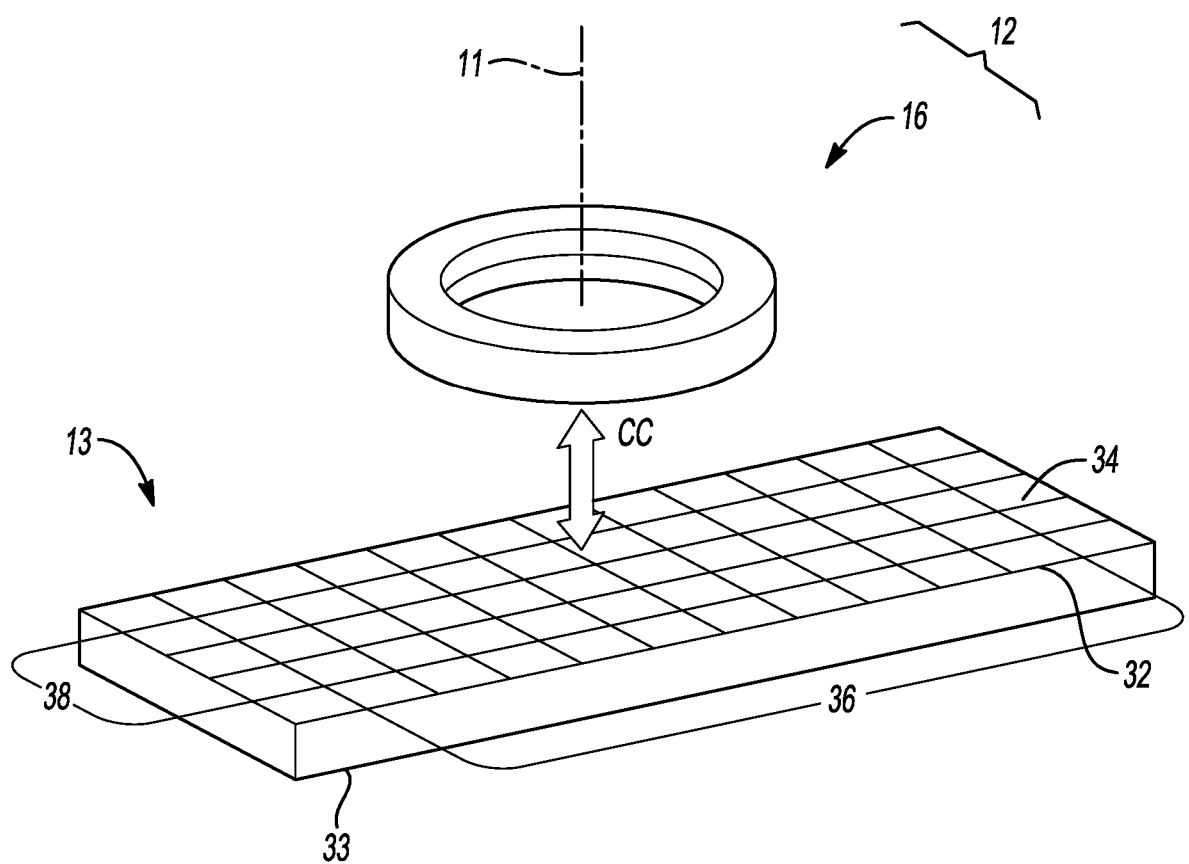
FIG. 4 is a schematic perspective view illustration of the input knob relative to an example touch surface.

FIG. 4 illustrates a partial exploded view of the touch screen device 12 and an embodiment of the touch surface 13. The touch surface 13, shown schematically as spaced apart from the input knob 16 for clarity as indicated by arrow CC, may cover a display substrate 33, and may extend along a plane positioned above such a display substrate 33. The touch surface 13 may be optionally configured as a capacitive touchscreen as noted above. Alternatively, the touch surface 13 may be an infrared touchscreen, a resistive touchscreen, or another application-suitable type of touchscreen. The touch surface 13 in the depicted embodiment includes a sensor 34 operable for detecting a touch event on the touch surface 13. The sensor 34 may include a plurality of send lines 36 and receive lines 38 arranged orthogonally with respect to the send lines 36 to form a coplanar sensing grid. Thus, operation of the input knob 16 causes a touch event to be registered at a particular point on the depicted touch surface 13, with the touch point having a corresponding location on the grid formed from the send lines 36 and receive lines 38.

Figure 5A:
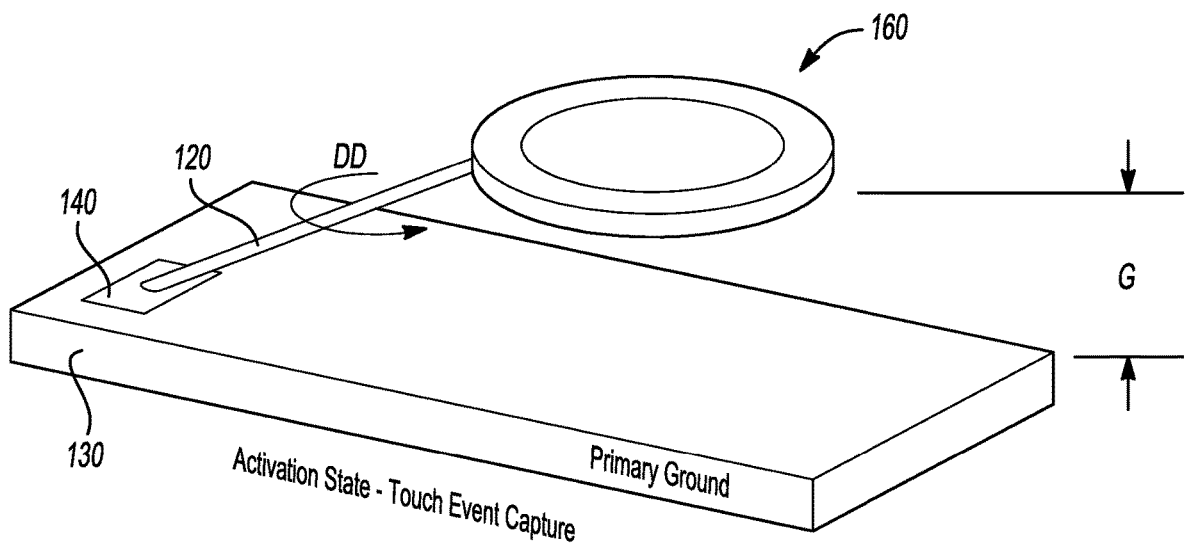
FIGS. 5A and 5B are schematic illustrations of a respective activation state (touch event capture) and open state (no touch activity) according to the disclosure, with a sensor registering a digital bit corresponding to the activation or open state.
Figure 5B:
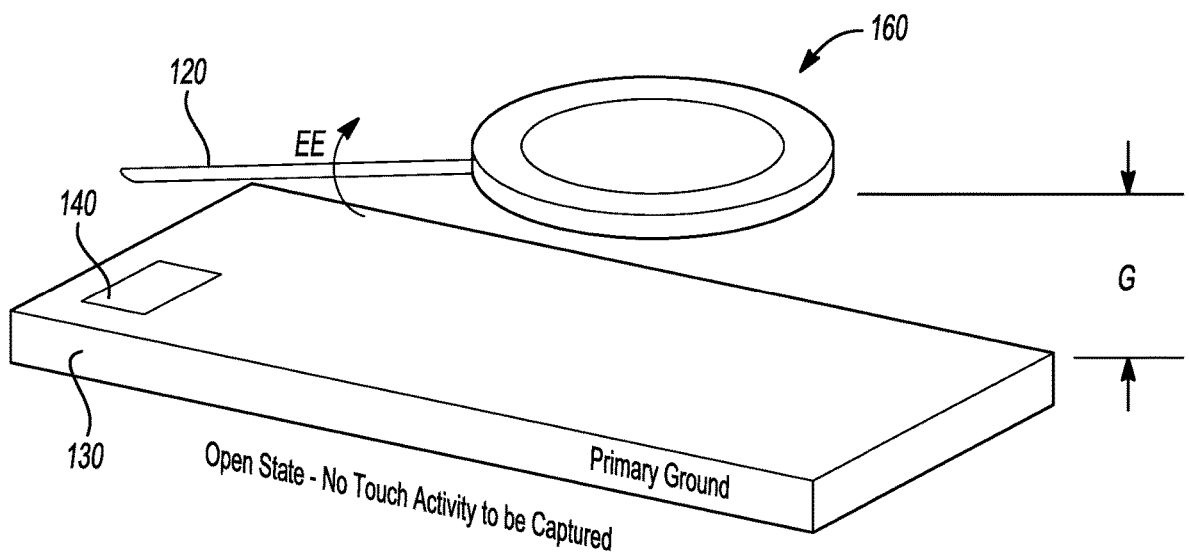

FIGS. 5A and 5B schematically depict operation of the input knob 16 in an activation state (FIG. 5A) in which a touch event is registered, and an open state (FIG. 5B) in which a touch event is not registered. Registration of a given touch event using the input knob 16, i.e., positive detection of a touch input and recognition of the same as an intended touch event, may be realized by configuring the input knob 16 to include a conductive mass 160, a switch element 120, a primary ground 130, and a capacitive touch element 140 adhered or otherwise connected to the primary ground. The conductive mass 160, which may be embodied as a metal ring or other integral part of the rotatable member 22 of FIG. 3, is separated a distance (G) apart from the primary ground 130, such as by interposing encoder structure as explained below with reference to FIG. 6. Thus, movement of the moveable member 22 of FIG. 3 selectively causes the switch element 120 to bridge the distance (G) such that the conductive mass 160 is effectively connected to the primary ground 130 via the touch element 140.

The conductive mass 160 has a mass and surface area sufficient to serve as a perceived ground from the perspective of the capacitive touch element 140, such that a touch event is positively detected whenever the switch element 120 is brought close to/into contact with the capacitive touch element 140. Although FIG. 5A shows the touch event as a direct physical connection between the switch element 120 and the capacitive touch element 140, the schematically depicted connection may be an electrical connection through an intervening third element such as a rotary encoder or slotted wheel. The conductive mass 160 is depicted as a ring or annulus to conform to the example input ring 16 of FIG. 3. However, alternative shapes may be envisioned within the scope of the disclosure, including but not limited to a horseshoe shape or solid disk shape. Providing the input knob 16 with a symmetrical shape may be advantageous, e.g., for aesthetic design reasons, but is not required within the scope of the disclosure.

FIG. 5B shows the open state in which the switch element 120 is separated from the capacitive touch element 140. The switch element 120 may include the spring 26 depicted in FIG. 6 and described below, or alternatively a pressurized or gravity-drive slide or other suitable mechanism, with the construction of the switch element 120 ultimately facilitating a transition between the open state of FIG. 5B and the activated state of FIG. 5A responsive to motion of the moveable member 22. For example, the transition between states may be triggered by a simple rotation of the input knob 16 as noted above, e.g., as shown in FIG. 2F.

Figure 6:
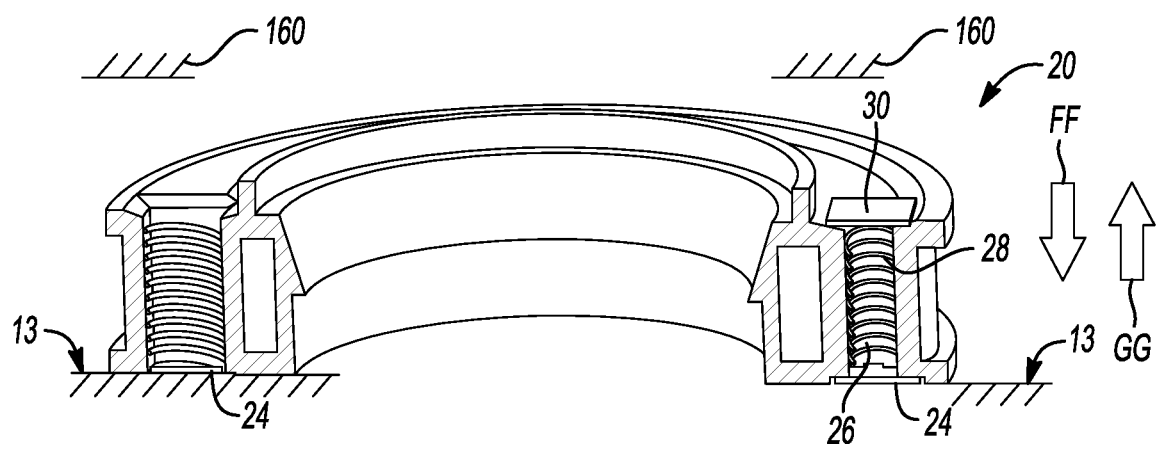
FIG. 6 is a schematic partial cross-section perspective view illustration of an example input knob having a stationary anchor member and a moveable member.

Referring to FIG. 6, which is a schematic cross-sectional view of the stationary member 20 of the input knob 16 shown in FIG. 3 in an exemplary configuration, the input knob 16 may be used to generate multiple discrete touch events in response to motion of the moveable member 22. For example, the input knob 16 may have two conductive base pads 24, with such conductive base pads 24 embodied as small conductive contacts or pads of copper or other suitable material. The function of such base pads 24 is analogous to that of the capacitive touch element 140 of FIG. 5. The touch surface 13, shown schematically in FIG. 4, remains in direct continuous contact with the conductive base pads 24. Because the base pads 24 are inserted into or integrally formed as part of the stationary member 20 in the illustrated embodiment, the base pads 24 do not move with respect to the touch surface 13, and thus form fixed reference positions on the input knob 16 relative to the center axis 11. The conductive base pads 24 are in selective contact with the conductive mass 160 (FIG. 4) via a switch in response to the movement of the moveable member 22.

In the example configuration of FIG. 6, such a switch is formed by the spring 26 disposed within a spring bore 28. Opposite each conductive base pad 24, a corresponding outer conductive pad 30, e.g., a patch of copper, may ride on the spring 26. Although omitted for simplicity, the interior contour or configuration of the moveable member 22 of FIG. 3 is such that movement of the moveable member 22 allows the outer conductive pad 30 to move outward/toward a user, as indicated by arrow GG, into direct contact with the conductive mass 160 housed therein and shown schematically in FIG. 5, e.g., a solid plate or block of ferromagnetic material or copper. Such contact occurs only at discrete points around a circumference of the input knob 16, specifically when the moveable member 22 of FIG. 3 is in a corresponding position over one or both of the conductive base pads 24.

The conductive mass 160 is used as a reference ground, with the specific mass used to construct the conductive mass 160 being at least about 10 grams in some embodiments, with the upper limit to the conductive mass 160 based on available packaging space or weight limits. In other words, the conductive mass 160 is sufficiently large, relative to the mass of the conductive base pads 24 and other connected structure forming the internal switch, to be effectively seen as the user from the perspective of the touch surface 13. The conductive base pads 24 and connected structure used to form the parts of the internal switch located on the side of the stationary member 20 should be small enough not to consume a significant amount of the available signal, e.g., in the milligram range.

Continued movement of the moveable member 22 will cause the outer conductive pad 30 to move out of direct contact with the conductive mass 160 as indicated by arrow FF. The effects of the change in capacitance at the touch surface 13 due to the intermittently-connected conductive mass 23 at discrete touch points is detected by the microcontroller 55 and may be used in the present method 50 to register touch points and ultimately identify the input knob 16 as being of a particular type or configuration. Other embodiments may be envisioned for implementing such an intermittent switch connection between the conductive base pads 24 and the conductive mass 160 and thereby realize a digital/binary output signal as shown in FIG. 7, and therefore the example structure of FIG. 6 is intended to be non-limiting and illustrative of the present teachings.

With two conductive base pads 24 used in the illustrated embodiment of FIG. 6, motion of the moveable member 20 will output two decoupled digital bits, i.e., two digital encoder signals. As a result, the input knob 16 may optionally embody a 2-channel rotary encoder describing at least the rotational speed and direction of the moveable member 22. Additional bits in the same or different input knobs 16 may be used to increase accuracy, functionality, and/or redundancy. When three bits are used, for instance, the additional bit may trigger a momentary switch, e.g., pressing of the input knob 16 at additional conductive base pads 24 may transmit the third bit to the microcontroller 55 of FIG. 1 to trigger performance of another operation, such as selection of a mode or display of additional information.

Figure 7:
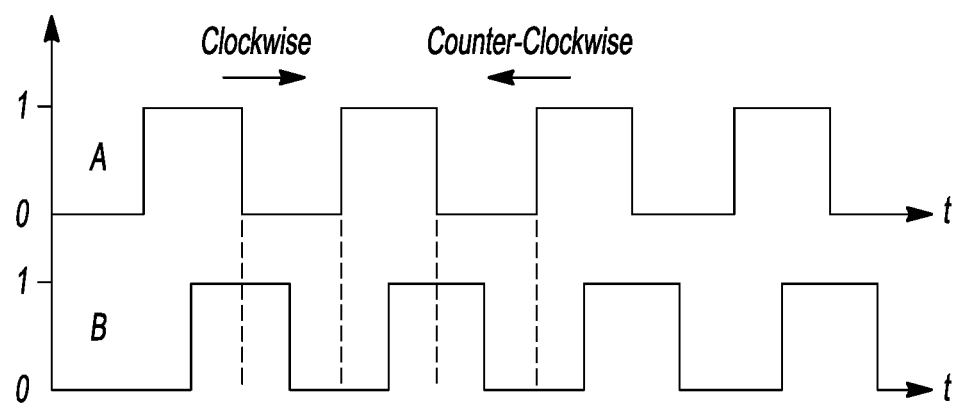
FIG. 7 is a binary time plot of bit registration responsive to rotation of the input knob.

Referring to FIG. 7, the above-described input knob 16, when configured as an optional 2-bit digital encoder, may output a pair of digital encoder signals A and B over a period of time (t) as the conductive mass 23 is placed in direct conductive contact with designated points on the touch surface 13. The digital encoder signals A and B thus embody square pulse trains having a low/0 state and a high/1 state as indicated on the vertical axis. Because the input knob 16 is able to rotate in either the clockwise or the counter-clockwise rotational direction, the microcontroller 55 of FIG. 1 is configured to automatically detect the rotational direction by processing of the digital encoder signals A and B.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An input knob for use with a touch screen device having a touch surface, the input knob comprising:
    a stationary member configured to be adhered to the touch surface, the stationary member including two or more conductive base pads configured to contact the touch surface, wherein the stationary member and the conductive base pads remain stationary with respect to the touch surface during operation of the input knob; and
    a moveable member containing a conductive mass forming a reference ground, wherein the moveable member is connected to the stationary member and configured to move relative to the stationary member, and to selectively output two or more bits of data indicative of a discrete touch event in response to a movement of the moveable member in which the conductive mass is connected respectively to or from the conductive base pads, the two or more bits of data representing at least a speed and a direction of the movement of the moveable member;
    wherein the input knob is characterized by an absence of a direct hardwired electrical connection to or through the touch surface.

2. The input knob of claim 1, wherein the moveable member is configured to rotate with respect to the stationary member as the movement.

3. The input knob of claim 2, wherein the moveable member is also configured to translate with respect to the stationary member as the movement.

4. The input knob of claim 2, wherein the moveable member includes a rotary encoder configured to output the two or more bits of data in response to the movement of the moveable member.

5. The input knob of claim 1, further comprising a plurality of switches, each respective switch of the plurality of switches being disposed within the stationary member between a respective one of the two or more conductive base pads and the conductive mass.

6. The input knob of claim 1, wherein the conductive mass is a solid plate or block of ferromagnetic material or copper.

7. The input knob of claim 1, wherein the moveable member is shaped as a ring or an annulus.

8. The input knob of claim 1, wherein the stationary member is removably adherable to the touch surface via a non-permanent adhesive material.

9. The input knob of claim 1, wherein the moveable member is constructed of or coated by a dielectric material.

10. A display system comprising:
a touch screen device having a touch surface; and
an input knob characterized by an absence of a direct hardwired electrical connection to or through the touch surface, the input knob having:
a stationary member that is adhered to the touch surface and including two or more conductive base pads, wherein the stationary member and the two or more conductive base pads remain stationary relative to the touch surface during operation of the input knob; and
a moveable member having a conductive mass forming a reference ground, wherein the moveable member is connected to and configured to move relative to the stationary member;
wherein the moveable member is configured to selectively output two or more bits of data indicative of a discrete touch event in response to a movement of the moveable member, the movement selectively connecting or disconnecting the conductive mass respectively to or from the conductive base pads to thereby register the two or more bits of data, the two or more bits of data representing at least a speed and a direction of the movement of the moveable member.

11. The display system of claim 10, further comprising:
a microcontroller in communication with the touch surface, wherein the microcontroller is configured to receive the two or more data bits and, in response to the two or more bits of data, to control an operating mode of one or more controlled subsystems.

12. The display system of claim 11, wherein the microcontroller is configured to display a plurality of icons on the touch surface, and to scroll between the plurality of icons in response to the movement of the moveable member.

13. The display system of claim 11, wherein the touch screen device is configured as an infotainment system, and wherein the operating mode is a mode setting of the infotainment system.

14. The display system of claim 11, wherein the moveable member is rotatable with respect to the stationary member as the movement, and includes a rotary encoder operable for outputting the at least two bits of data responsive to rotation of the moveable member.

15. The display system of claim 11, further comprising a plurality of switches, each respective one of the switches being disposed within the stationary member between a respective one of the two or more conductive base pads and the conductive mass.

16. The display system of claim 15, wherein the conductive mass is a solid plate or block of ferromagnetic material or copper.

17. The display system of claim 10, wherein the moveable member is shaped as a ring or an annulus.

18. The display system of claim 10, wherein the stationary member is removably adherable to the touch surface via a non-permanent adhesive material.

19. The display system of claim 10, wherein the moveable member is constructed of or coated by a dielectric material.

20. A display system comprising:
a touch screen device having a touch surface;
an input knob characterized by an absence of a direct hardwired electrical connection to or through the touch surface, and having:
an annular stationary member that is adhered to the touch screen, and that includes two or more conductive base pads, such that the annular stationary member and the conductive base pads remain stationary with respect to the touch screen during operation of the input knob, wherein the annular stationary member defines two or more spring bores each containing a respective spring therein, and wherein the two or more conductive base pads are in direct continuous contact with the touch surface and in selective contact with a conductive mass of the input knob via respective electrically-conductive switches each disposed within a respective one of the spring bores; and
an annular rotatable member containing the conductive mass as a reference ground, the conductive mass being constructed of a ferromagnetic material or copper, the annular rotatable member being connected to and configured to rotate relative to the annular stationary member to selectively connect the two or more conductive pads to the conductive mass via the two or more springs as a discrete touch event, wherein the input knob is configured to selectively output two or more bits of data indicative of the discrete touch event, the two or more bits of data representing at least a speed and a direction of the rotation of the annular rotatable member; and
a microcontroller in communication with the touch surface, wherein the microcontroller is configured to receive the two or more data bits and, in response to the two or more bits of data, to control an operating mode of one or more controlled subsystems.

* * * * *